US012753995B2

(12) United States Patent
Dalton et al.

(10) Patent No.: US 12,753,995 B2
(45) Date of Patent: Oct. 6, 2026

(54) DEVICES WITH LOW THERMAL EMISSIVITY

(71) Applicant: Advanced Material Development Limited, Surrey (GB)

(72) Inventors: Alan Dalton, Surrey (GB); Peter Lynch, Surrey (GB); Matthew Large, Surrey (GB); Sean Ogilvie, Surrey (GB)

(73) Assignee: Advanced Material Development Limited, Surrey (GB)

( * ) Notice: Subject to any disclaimer, the term of this patent is extended or adjusted under 35 U.S.C. 154(b) by 113 days.

(21) Appl. No.: 18/279,494

(22) PCT Filed: Mar. 3, 2022

(86) PCT No.: PCT/EP2022/055483

§ 371 (c)(1),
(2) Date: Aug. 30, 2023

(87) PCT Pub. No.: WO2022/184866

PCT Pub. Date: Sep. 9, 2022

(65) Prior Publication Data

US 2024/0151498 A1 May 9, 2024

(30) Foreign Application Priority Data

Mar. 4, 2021 (GB) .................................... 2103036
Apr. 30, 2021 (EP) .................................... 21171668

(51) Int. Cl.
*F41H 3/02* (2006.01)
*C01B 32/159* (2017.01)

(52) U.S. Cl.
CPC ............ *F41H 3/02* (2013.01); *C01B 32/159* (2017.08); *C01B 2202/02* (2013.01);
(Continued)

(58) Field of Classification Search
CPC ........................................................ F41H 3/02
See application file for complete search history.

(56) References Cited

U.S. PATENT DOCUMENTS 5,312,678 A * 5/1994 McCullough, Jr. ....... F41H 3/00 442/247
6,338,292 B1 * 1/2002 Reynolds ................. F41H 3/00 89/36.01

(Continued)

FOREIGN PATENT DOCUMENTS

CN 104715934 6/2015
WO WO 2018/128906 7/2018

OTHER PUBLICATIONS

Sun et al. Adv. Optical Mater. 2021, 9, 2001216, p. 1-9, published online Nov. 26, 2020) (Year: 2020).*

(Continued)

*Primary Examiner* — Liam J Heincer
(74) *Attorney, Agent, or Firm* — Casimir Jones, S.C.; Thomas J. Lyneis

(57) ABSTRACT

The invention provides devices for active modification of thermal radiation, the devices comprising: (i) a substrate; (ii) one or more polymeric permeable membranes comprising an ionic liquid electrolyte; (iii) one or more electrodes comprising carbon nanotubes deposited onto the surface of at least one of the one or more polymeric membranes; and (iv) a protective encapsulation layer. The invention also provides methods of making such devices.

14 Claims, 8 Drawing Sheets

(52) U.S. Cl.
CPC ...... *C01B 2202/22* (2013.01); *C01B 2202/34* (2013.01); *C01B 2202/36* (2013.01); *C01P 2004/03* (2013.01)

(56) References Cited

U.S. PATENT DOCUMENTS

| | | | | |
|---|---|---|---|---|
| 7,601,771 | B2 * | 10/2009 | Schmidt | C08K 5/19 524/95 |
| 11,976,162 | B2 * | 5/2024 | Friesen | C08G 59/5073 |
| 2004/0208912 | A1 * | 10/2004 | Hayes | D01F 1/07 424/443 |
| 2007/0009679 | A1 * | 1/2007 | Holcombe | F41H 3/02 428/17 |
| 2010/0000441 | A1 * | 1/2010 | Jang | C09D 11/102 106/31.13 |
| 2010/0112316 | A1 * | 5/2010 | Cincotti | F41H 3/02 204/192.1 |
| 2011/0183180 | A1 | 7/2011 | Yu et al. | |
| 2011/0226738 | A1 | 9/2011 | Lee | |
| 2011/0287316 | A1 | 11/2011 | Lu et al. | |
| 2012/0064311 | A1 * | 3/2012 | Picciotto | F41H 3/00 156/60 |
| 2014/0175281 | A1 | 6/2014 | Reynolds et al. | |
| 2014/0227548 | A1 * | 8/2014 | Myrick | C10L 1/28 203/40 |
| 2017/0062141 | A1 | 3/2017 | Zhamu et al. | |
| 2017/0092975 | A1 * | 3/2017 | Kim | H01M 8/1093 |
| 2017/0278643 | A1 | 9/2017 | El-Kady et al. | |
| 2018/0066922 | A1 * | 3/2018 | Howland | B32B 23/10 |
| 2018/0174766 | A1 | 6/2018 | Zhamu et al. | |
| 2018/0282164 | A1 * | 10/2018 | Abdelkader | C25B 1/00 |
| 2018/0342357 | A1 | 11/2018 | Nguyen et al. | |
| 2021/0104369 | A1 * | 4/2021 | Gangopadhyay | H01G 11/34 |
| 2022/0185668 | A1 * | 6/2022 | Jin | B32B 3/266 |
| 2022/0229215 | A1 * | 7/2022 | Shibuya | G02B 5/208 |
| 2023/0016870 | A1 * | 1/2023 | Deng | B01D 67/0079 |
| 2023/0142072 | A1 * | 5/2023 | Ho | H01M 4/136 429/212 |
| 2023/0142469 | A1 * | 5/2023 | Dalton | C09D 11/033 428/206 |
| 2023/0207781 | A1 * | 6/2023 | Feng | H01M 4/625 252/182.1 |
| 2023/0296356 | A1 * | 9/2023 | Morag | F41H 3/00 428/411.1 |
| 2023/0343963 | A1 * | 10/2023 | Ho | H01M 4/62 |
| 2024/0093968 | A1 * | 3/2024 | Hertel | D06M 11/83 |
| 2024/0105956 | A1 * | 3/2024 | Kato | H01M 4/139 |
| 2024/0313194 | A1 * | 9/2024 | Sun | H01M 4/62 |
| 2024/0384123 | A1 * | 11/2024 | Dalton | C01B 32/194 |

OTHER PUBLICATIONS

International Search Report for PCT/EP2022/055483, mailed Jun. 24, 2022, 14 pages.

Extended European Search Report for EP 21171668.3, mailed Oct. 26, 2021, 9 pages.

Salihoglu et al., "Graphene Based Adaptive Thermal Camouflage", Nanoletters, (2018), 18, pp. 4541-4548.

Zhao et al., "Tunable Infrared Emissivity in Multilayer Graphene by Ionic Liquid Intercalation", Nanomaterials, (2019), 9(8), pp. 1096.

Kamboj et al, "Low-bias gate tunable terahertz plasmonic signatures in chemical vapour deposited graphene of varying grain size", Proceedings of Spie, (2016), 9747, pp. 974707.

Lee et al., "Flexible electrochromic and thermochromic hybrid smart window based on a highly durable ITO/graphene transparent electrode", Chemical Engineering Journal (2021), 416, 129028. 8 pages.

Wang et al., "Charge-compensated, semiconducting single-walled carbon nanotube thin film as an electrically configurable optical medium", 2013, Nature Photonics, 7, p. 459-465.

Stekovic et al., "High Modulation Speed, Depth, and Coloration Efficiency of Carbon Nanotube Thin Film Electrochromic Device Achieved by Counter Electrode Impedance Matching", 2018, Advanced Materials Interfaces, 5, 11 pages.

* cited by examiner

DEVICES WITH LOW THERMAL EMISSIVITY

STATEMENT OF RELATED APPLICATIONS

This application is a national phase application under 35 U.S.C. § 371 of PCT International Application No.: PCT/EP2022/055483, filed on Mar. 3, 2022, which claims the benefit of GB Patent Application No. 2103036.6, filed Mar. 4, 2021, the contents of each of which are incorporated by reference herein.

INTRODUCTION

This present invention relates to devices with low thermal emissivity containing carbon nanomaterials, methods of making such devices and applications of the devices.

BACKGROUND TO THE INVENTION

The active control of thermal emissivities from surfaces is important for a range of industrial applications which require the reduction of a thermal signature to assist in the overall heat efficiency and heat loss. For some applications, such as thermal regulation of buildings, it is desirable to reduce and control emissitivites commensurate with solar radiation profiles to reduce the energy costs of heating and cooling. For example, materials with tunable infra-red properties, such as transparency and/or emissivity, may be useful in thermal windows and emissive temperature control.

Carbon nanotubes are nanosized tubes constructed from rolled sheets of graphite. The tubes typically have a diameter in the range of 1 to 50 nanometres, but can have lengths in the micrometre range. Carbon nanotubes can be either single-walled (i.e. formed from a single rolled sheet of graphene) or multi-walled (i.e. formed from a plurality of concentric rolled sheets of graphene). Carbon nanotubes have attracted great interest due to their physical properties—namely their high tensile strength and high electrical conductivity.

2D materials are known to have many interesting and potentially useful properties, which differ from the properties of the corresponding bulk 3D material. For example, graphene is highly conductive and has applications in electrode structures as well as in conductive composites. The interesting functional properties of many materials are often only observed when the materials are in their mono- or few-layer (i.e. 2D) forms. However, to make use of these nanocarbon properties, convenient methods of isolating these forms are required. The strong interlayer dispersion forces must be overcome in order to exfoliate bulk three-dimensional (3D) materials to form the corresponding 2D materials. Liquid phase exfoliation and dispersion using high shear mixing is an accessible route towards producing formulated inks containing 2D materials which find uses in many industrial applications.

Salihoglu et al., Nano Lett. (2018), 18, 4541-4548 describes a graphene-based adaptive thermal camouflage device comprising a layer of graphene, a layer of a polyethylene membrane soaked with an ionic liquid and a layer of a gold electrode to form a planar capacitor. The graphene was deposited using a chemical vapour deposition technique, which does not easily lend itself to large scale production in the same manner that a liquid-based and printable nanocarbon layer would.

There therefore remains the need for alternative devices for thermal camouflage, preferably those with improved properties, including improved scalability (for example, areal scalability).

SUMMARY OF THE INVENTION

Without wishing to be bound by theory, the inventors believe that a thermally adaptive camouflage device comprising nanoparticulate graphite/graphene and/or carbon nanotubes can use the principle of Pauli Blocking to modify the band structure of graphene to block state transitions (see FIG. 1). The band structure of graphene can be simplified and represented as a Dirac cone in which energy (E) is linear with momentum (k). In the ground state the Fermi Level, the state below which all states are occupied at absolute zero, rests close to the point of the cones. An incident photon would then cause excitation of an electron into an empty state causing an absorption event (FIG. 1—left). The Fermi level can be raised causing the occupancy of more states. If the same photon then interacts with the modified graphene the electron cannot be excited due to there being no available unoccupied state (FIG. 1—right).

This allows a graphene-based or carbon nanotube-based device that can have a emissivity of thermal radiation tuned by adjusting the Fermi level by applying a potential bias or by doping.

Large area devices of this type (when constructed using nanocarbon electrodes in planar electrolytic capacitors and integrated onto a suitable substrate) act to reduce the apparent emissivity of a thermal body. It has been found that devices made from nanocarbon materials are able to lower their emissivity due to their inherent electronic and resulting phonon effects when powered.

For large area devices, it is preferable for the fabrication method to be solution-based (rather than, for example, based around the transfer of ultra-thin film CVD deposited graphene). The construction of the electrolytic capacitor device also requires elements of a thin porous membrane separator and a liquid ionic electrolyte to be developed such that fast switching times and large observable differences can be obtained. Nanocarbon materials also exhibit a large surface area to volume ratio which assists the accumulation of charge on local surfaces. The operating range and switching times of these devices therefore are also driven by the physical properties of the electrolyte and the diffusivity into the internal structure of the electrode.

To enable the device's low power consumption and large area operation, it is preferred that the electrode film's internal resistive losses are minimised as far as possible by the use of conductive carbon nanomaterials (for example carbon nanotubes and/or graphite nanoplatelets).

Accordingly, in a first aspect, the invention provides a device for active modification of thermal radiation, the device comprising:

(i) a substrate;

(ii) one or more polymeric permeable membranes comprising an ionic liquid electrolyte;

(iii) one or more electrodes comprising carbon nanotubes deposited onto the surface of at least one of the one or more polymeric membranes; and (iv) a protective encapsulation layer.

The one or more electrodes may comprise additional carbon nanomaterials, in addition to carbon nanotubes. For example, the electrodes may comprise carbon nanotubes together with graphite nanoplatelets (also referred to as few-layer graphene).

Preferably the device comprises a pair of electrodes. The electrodes may both comprise carbon nanotubes (and optionally additional carbon nanomaterials as described herein). Alternatively, when more than one electrode is present, the electrodes may be formed from different materials.

The device also comprises a protective encapsulation layer, which protects the electrodes and polymeric membranes from damage and/or degradation. This layer is preferably IR transparent so as not to interfere with the optical (e.g. emissivity) properties of the device. The protective encapsulation layer may be flexible and polymeric in nature. The protective layer may prevent water vapour and/or oxygen molecules from diffusing into the device, which reduces device lifetimes by facilitating unwanted chemical reactions. This layer is affixed onto the device and then sealed for operation.

The electrodes are deposited onto the polymeric membrane(s) such that the electrodes are in contact with polymeric membrane(s) to allow ionic/electron transport from the polymeric membrane(s) to the electrodes. These polymeric membrane(s) serve as separators to prevent electrical shorting between the electrodes. When a potential difference is applied to the pair of electrodes, the occupation of electrons in the Fermi level of the electrodes can be adjusted and therefore the thermal emissivity of the device can be altered.

As described above, the devices can be used for the active modification of thermal radiation. This may include modulating the transparency and/or reflectance of the device or the emissivity of the device.

Surfaces of controlled emissivity allow the thermal control by changing heat loss due to radiation. The heat loss due to radiation is proportional to the emissivity of the surface and the temperature differential to the power of four (4). As such, the invention presents an avenue to controlling the temperature of computer components with minimal power consumption. This is of particular use in environments where convection and conduction are not appropriate.

Another example of this is the reduction of heat loss within glazing products. Glass exhibits a high emissivity and thus radiates heat readily. By lowering the outer emissivity relative to the environment, heat loss can be reduced. The devices of the invention are therefore able to be either integrated within glazing laminates or affixed as an outer laminate.

As shown in the examples below, when a device according to the invention is positioned between a thermally radiating object and a detector, the thermal radiation detected by the detector is reduced. The devices of the invention can therefore effectively block thermal radiation from heat sources and therefore can act as thermal camouflaging devices. The devices for active modification of thermal radiation can therefore also be considered to be devices for camouflaging/concealing/masking/obscuring/suppressing thermal radiation.

Accordingly, the invention also provides a method of actively modifying (e.g. camouflaging/concealing) thermal radiation from an object, the method comprising placing a device as described herein between the object and a thermal radiation detector. The method may include covering or surrounding the object with a device as described herein. A further example of this is for the protection of sensitive infra-red detector devices which are used for astronomical observation.

The devices can be formed by depositing (e.g. printing or spraying) an ink containing the carbon nanomaterials onto one or onto a pair of polymeric membranes. The polymeric membranes(s) are typically infused with the ionic liquid. To achieve this, the polymeric membrane may be formed as a porous membrane and then, following its formation, the ionic liquid may be applied to (e.g. soaked into) the porous membrane such that it infiltrates into the pores therein. The polymeric membrane(s) can be infused with the ionic liquid before or after the electrodes are deposited onto the membrane. Alternatively, the polymeric membrane may be co-cast with the ionic liquid to form the infused polymeric membrane.

Accordingly, the invention also provides a method of making a device as described herein, the method comprising:

(a) depositing a liquid composition comprising carbon nanotubes (and optionally graphite nanoplatelets) onto at least one (e.g. both) of a first and second polymeric permeable membrane in order to form a film comprising carbon nanotubes (and optionally graphite nanoplatelets) on the membranes;
(b) impregnating the first and second polymeric membrane with an ionic liquid; and
(c) securing the first and second polymeric membranes to each other.

Alternatively, the polymeric membranes comprising the ionic liquid may be formed before the liquid composition comprising carbon nanomaterials is printed onto the polymeric membrane. Accordingly, the invention also provides a method of making a device as described herein, the method comprising:

(a) forming first and second polymeric permeable membranes comprising an ionic liquid;
(b) depositing a liquid composition comprising carbon nanotubes (and optionally graphite nanoplatelets) onto at least one (e.g. both) of the polymeric membrane in order to form a film comprising carbon nanotubes (and optionally graphite nanoplatelets); and
(c) securing the first and second polymeric membranes to each other.

Step (a) may comprise impregnating the polymeric permeable membranes with the ionic liquid or co-casting the membranes from a polymer and the ionic liquid.

The invention also provides a method of making a device as described herein, the method comprising:

(a) providing a substrate;
(b) depositing a liquid composition comprising carbon nanotubes (and optionally graphite nanoplatelets onto the substrate to form a first electrode;
(c) depositing a liquid comprising a polymer and an ionic liquid onto the first electrode to form a polymeric permeable membrane comprising the ionic liquid; and
(d) depositing a liquid composition comprising carbon nanotubes (and optionally graphite nanoplatelets onto the polymeric permeable membrane to form a second electrode.

The methods above may also comprise the steps of securing the first and second polymeric membranes to a substrate and/or applying a protective encapsulation layer to the polymeric membranes.

The invention additionally provides devices obtained according to the methods described herein.

DETAILED DESCRIPTION OF THE INVENTION

The term "carbon nanomaterials" or "nanocarbon" as used herein refers to nanomaterials (i.e. materials having an average size from 1 nm to 100 nm in at least one dimension) that comprise or consist of carbon. Typically, the carbon nanomaterials comprise at least 90% or more by weight, preferably at least 95% or more by weight, for example 99% or more by weight of carbon. The term includes materials such as graphene, graphite nanoplatelets, single-walled carbon nanotubes, multi-walled carbon nanotubes, crystalline diamond, and diamond-like carbon (see the following ISO standard: ISO/TS 80004-3:2020).

As discussed above, the electrodes comprise carbon nanotubes (preferably single-walled carbon nanotubes). The electrodes may also comprise graphite nanoplatelets.

The carbon nanotubes may be single-walled carbon nanotubes or multi-walled carbon nanotubes, but preferably comprise or consist of single-walled carbon nanotubes. The carbon nanotubes may be metallic carbon nanotubes or semiconductor carbon nanotubes. The carbon nanotubes typically have an outer mean diameter of from 1 nm to 5 nm, preferably from 1 nm to 2 nm (as determined by transmission electron microscopy) and may have a length of greater than 3 μm, typically greater than 5 μm, for example greater than 10 μm or greater than 15 μm. Whereas the nanoplatelets described below are micron-sized in two dimensions, carbon nanotubes are only micron-sized in a single dimension (i.e. along their length).

The term "graphite nanoplatelets" as used herein (also referred to herein as "graphene nanoplatelets") refers to nanoparticles of graphite which consist of small stacks of graphene. The term graphite nanoplatelets refers to nanoplatelets having on average 20 or fewer layers, typically 15 layers or fewer, preferably 10 or fewer layers. Layer numbers can be determined by UV-vis spectroscopy (see C. Backes et al., 'Spectroscopic metrics allow in-situ measurement of mean size and thickness of liquid-exfoliated graphene nanosheets', Nanoscale, 2016, doi: 10.1039/C5NR08047A).

The nanoplatelets typically have an average thickness of less than 30 nm, for example less than 20 nm. The term "thickness" as used herein refers to the dimension of the nanoplatelets along the axis of stacking of the layers within the nanoplatelets. The terms "length" and "width" refer to the longer and shorter dimensions of the nanoplatelets along perpendicular axes in the plane of the sheets of the layered materials respectively (see FIG. 2).

The nanoplatelets typically have an average length and/or width of 30 nm or greater, preferably 50 nm or greater or 100 nm or greater. The nanoplatelets typically have an average length and/or width of 10 μm or less, typically 3.0 μm or less, for example 2.0 μm or less, typically 1.5 μm or less, preferably 1 μm or less, for example 800 nm or less. In some instances, dependent on specific exfoliation processes of these materials, graphite nanoplatelets have larger lateral dimensions that are greater than 1 μm and less than 50 μm. The number vs size distributions of these materials may be broad or narrow depending on the exfoliation technique employed and/or any subsequent size selection process.

The dimensions of the nanoplatelets can be measured using scanning or transmission electron microscopy. The nanoplatelets are typically only micron-sized in up to two dimensions (i.e. their length and width, with their thickness being significantly less than 1 μm, for example less than 100 nm). These dimensions are preferably measured by transmission electron microscopy.

When present, the graphite nanoplatelets are typically present in the electrodes in an amount of from 25% (w/w), preferably from 30% (w/w), for example from 35% (w/w) and up to 50% (w/w), preferably up to 45% (w/w), for example up to 40% (w/w).

When the electrodes comprise a mixture of carbon nanotubes and graphite nanoplatelets, the carbon nanotubes may be present in the electrodes described herein in a weight ratio relative to the amount of graphite nanoplatelets of greater than 0.15:1 (carbon nanotubes:graphite nanoplatelets), preferably greater than 0.2:1 and in a ratio of up to 1:1, suitably up to 0.7:1, preferably up to 0.6:1.

For example, the carbon nanotubes are typically present in the electrodes in a weight ratio relative to the amount of graphite nanoplatelets of from 0.15:1 to 0.6:1 (carbon nanotubes:graphite nanoplatelets), preferably in a ratio of from 0.4:1 to 0.5:1.

Alternatively, the quantity of carbon nanotubes in the electrodes may be defined relative to the weight of the total composition. The carbon nanotubes are typically present in the electrodes composition in an amount of from 5% (w/w), preferably from 10% (w/w), for example from 15% (w/w) and up to 30% (w/w), preferably up to 25% (w/w), for example up to 20% (w/w).

Alternatively, when the electrodes comprise carbon nanotubes as the only carbon nanomaterial, the carbon nanotubes may be present in the electrodes in an amount of 50% or greater, preferably 75% or greater by weight, such as 90% or greater by weight, for example 95% or greater by weight.

In the devices described herein, the electrodes typically have a thickness of from 10 nm to 750 nm, typically from 20 nm to 500 nm, for example from 50 nm to 250 nm.

The electrodes are typically deposited onto the polymeric membrane from a liquid composition (or "ink"). For example, liquid compositions comprising the carbon nanomaterials and a solvent (and optionally other thickening agents, binders and other additivities described below) can be sprayed or printed onto the polymeric membrane.

The solvent may be an aqueous or non-aqueous solvent. However, the solvent preferably is or comprises water (necessary for hydrogel formation). Alternatively, the solvent may be a dipolar aprotic solvent. Examples of such dipolar aprotic solvents include cyclopentanone, cyclohexanone, N-methylpyrrolidone (NMP), dimethylformamide (DMF), dimethylsulphoxide (DMSO), dimethylacetamide (DMAc), sulpholane, dihydrolevoglucosenone (Cyrene) and lactones, such as gamma-valerolactone. When gamma-valerolactone is present, it may be present in the liquid compositions in amount of from 1% to 10% (w/w), for example up to 5% (w/w) or from 5% (w/w) to 10% (w/w), preferably from 6% to 10% (w/w).

The liquid compositions (containing carbon nanotubes and optionally additional carbon nanomaterials) may also include a thickening agent (which may also act as gelification agents) to increase the viscosity of the compositions. The increased viscosity ensures that the compositions are suitable for printing and also reduces tendency of the carbon nanomaterials to flocculate from suspension.

The thickening agent is preferably a hydrogel-forming thickening agent. The formation of a hydrogel matrix containing carbon nanotubes and additional carbon nanomaterials (for example, graphite nanoplatelets) results in a highly electrically conductive ink. The hydrogel-forming thickening agents are generally hydrophilic polymer chains which form a colloidal gel through hydrogen-bonding in water.

Examples of suitable thickening agents include:

cellulose derivatives, such as carboxymethyl cellulose (CMC), methyl cellulose, hydroxy ethyl cellulose and carboxy ethyl cellulose, and salts thereof (such as sodium salts thereof);

polymers such as polyethylene oxide (PEO), polypropylene oxide (PPO); polyanaline (PANI), polyvinylpyrrolidone (PVP), polyvinyl alcohol (PVA) and poly N-isopropylacrylamide (PNIPAAm);

cyclodextrins;

natural gelification agents such as xanthan gum, gelatine, glycerol, alginates, chitosan;

inorganic silicas and clays such as bentonite, montmorillonites, laponite, nano-silica and titania; and filamentous or rod-like materials, for example those having an aspect ratio of greater than 100 (e.g. carbon nanotubes).

In a preferred embodiment, the thickening agent is a cellulose derivative, such as carboxymethyl cellulose. The term cellulose derivate as used herein refers to chemical derivatives of cellulose formed by functionalisation of some or all of the hydroxyl groups present in cellulose (for example via etherification or esterification reactions). Derivatives can be formed by incorporation of one or more or all of carboxy, hydroxy, methyl, ethyl and/or propyl groups. Examples of cellulose derivatives include hydroxypropyl methylcellulose, hydroxypropyl cellulose, methyl ethyl cellulose, methyl cellulose and carboxymethylcellulose or a combination thereof, as well as cellulose itself. CMC is available in several forms (e.g. varying by degree of substitution and function) and can be crosslinked with several chemical agents either covalently or through hydrogen bonding networks with other agents to impart new properties which can be tailored according to requirements (Gels 2018, 4, 54; doi:10.3390/gels4020054).

Cellulose derivatives readily form hydrogels which are utilised in many industrial applications. These materials may also act as surface-active agents which stabilise nanocarbon materials in aqueous solvents. Hydrogels exhibit ideal thixotropic behaviour due to their extended hydrogen bonding or supramolecular network formation behaviour. These networks serve to provide long range ordering to improve rheological behaviour.

The total concentration of the thickening agents may be in the range of 0.5% to 2% by weight of the total liquid composition (including the solvent), for example from 1% to 1.75% by weight of the total liquid composition.

The thickening agent increases the viscosity of the composition and it is envisaged that it also enables the carbon nanotubes to form a pre-ordered supramolecular network, which increases the conductivity of electrodes printed from the composition.

The viscosity of the composition is important to ensure that it can be printed to form a film. In addition, the composition should be viscous enough to prevent flocculation of the carbon nanomaterials within the composition. The precise viscosity will of course depend on the application of the composition (and the resulting film). The thickening agent also ensures that the inks have a viscosity suitable for printing, e.g. screen printing. The inks suitable for screen-printing are typically thixotropic and therefore their viscosity is dependent on shear rate. The liquid compositions (containing the carbon nanotubes and optionally additional carbon nanomaterials) may have a viscosity of from 100 to 1000 Pa·s at a shear rate of 0.1/s and/or may have a viscosity of from 1 to 10 at a shear rate of 100/s.

The liquid compositions may also include one or more surfactants. The surfactants are typically non-ionic surfactants. Examples of suitable non-ionic surfactants include polyethylene oxide-based (PEO) surfactants (e.g. Triton X-100), polypropylene oxide-based (PPO) surfactants, cyclodextrins and polyvinyl pyrrolidone (PVP) surfactants. However, ionic surfactants, such as sulphate-based surfactants (such as sodium dodecyl sulphate) may also be used.

The total concentration of the surfactants may be in the range of 0.01% to 1% or 0.01% to 0.1% by weight of the total composition (including the solvent), for example from 0.02% to 0.05% by weight of the total composition.

The compositions may also comprise one or more solvents and or adhesives in order to improve adhesion of the dried film (formed by printing the ink) to a substrate. The nature and combinations of adhesives will of course be dependent on the substrate.

The compositions may also comprise one or more cross-linking agents in order to improve the rheological parameters of the ink and/or properties of resulting films. This may include a wide range of functional organic acids or bases such as ascorbic acid. Examples of further cross-linking agents include di- and tri-carboxylic acids, such as glutaric acid and trimesic acid. This crosslinking serves to stabilise films from rapid redissolution and effects of ambient humidity on conductivity.

The compositions may also comprise one or more humectants to aid the printability of the inks within industrial processes. In aqueous based compositions, the addition of urea, glycerin, or glycols such as polypropylene glycol slows the ink drying process such that constant and repeatable printing can be obtained.

In addition, the compositions may further comprise a setting (cross-linking) agent, which is a material that cures upon exposure to heat or radiation to cure and set the liquid ink compositions into a solid film. These include photocurable monomers or infra-red activated agents, e.g. epoxides (which may undergo ring opening reactions), aldehydes or acids (which may undergo esterification reactions) such as citric acid.

Alternatively, films formed with binders containing mono-valent ions, such as sodium carboxymethyl cellulose, may be treated with aqueous solutions of bi, tri or tetra valent ionic salts such as Calcium (II) Chloride or Iron (III) Sulphate to form ionically-cross-linked insoluble films by a process of ion exchange.

The carbon nanomaterial-containing liquid compositions are deposited on a polymeric membrane as electrodes to form the device of the invention.

Preferably the device comprises a pair of electrodes. The electrodes may both comprise carbon nanotubes (and optionally additional carbon nanomaterials). Alternatively, when more than one electrode is present, the electrodes may be formed from different materials. For example, a first electrode may comprise carbon nanotubes and a second electrode may be a metallic electrode. In this arrangement, typically, the electrode adjacent the substrate is a non-carbon nanomaterial containing electrode.

The device preferably comprises a pair of electrodes comprising carbon nanotubes (and optionally further carbon nanomaterials, such as graphite nanoplatelets). However, devices of the invention may comprise a first carbon-containing electrode and a second electrode, which has a different composition to the first electrode. For example, the second electrode may be a metallic electrode, such as a gold, silver or copper electrode.

The polymeric permeable membrane is a dielectric material and is therefore electrically insulating. The polymeric membrane is also capable of holding an ionic liquid (in a similar manner to a capacitor or battery device). For example, the polymeric membrane may comprise polyethylene, polypropylene, polyvinylidene fluoride (PVDF), polyimide, cellulose, a cellulose derivative, or a mixture thereof. In preferred embodiments, the polymeric membrane is a polyethylene (PE) membrane, a polypropylene (PP) membrane or a PE/PP membrane.

The ionic liquid is preferably a room temperature ionic liquid. Room temperature ionic liquids (RTIL) are a class of liquids with a low melting point that allow conductivity due to their ionic nature. The ionic liquid preferably has an electrochemical window of (plus/minus) 4V or greater, for example 4.5V or greater.

As noted above, the ionic liquid may be introduced or infused into the polymeric membrane either during or after its production.

In some embodiments, the polymeric membrane is infused with the ionic liquid by first forming a porous polymeric membrane and then applying (e.g. soaking) the ionic liquid into the membrane.

Alternatively, the ionic liquid infused membrane comprises a solid co-cast film of a suitable polymer with an ionic liquid commonly know as a solid polymer electrolyte. To prepare such solid polymer electrolytes, a dielectric polymer and the ionic liquid are dissolved in a appropriate solvent, in which they are both soluble (for example polar, aprotic solvents, such as acetone, DMF or NMP) and then the solvent is removed to form the polymeric layer infused with the ionic liquid.

When the polymeric membrane is co-cast from the polymer and ionic liquid, it may be cast on top of a previously coated layer of the electrode comprising carbon nanotubes. This approach has several advantages. Firstly, this reduces the seepable liquids which could leak from the device. Secondly, the method of device construction can be made simpler by virtue of a multistep coating and encapsulation process. In addition, mechanically, the device is less prone to electrical breakdown through localised stress induced damage.

As the devices described herein may be exposed to the environment in use, they should be able to be operated sufficiently in ambient conditions. Water present in the air is one possible source of detrimental effects due to the low potential window of water to electrolysis (1.23V) as well as material interaction considerations. Accordingly, the ionic liquids are preferably hydrophobic ionic liquids.

Examples of a suitable ionic liquids for use in the devices described herein are diethylmethyl(2-methoxyethyl)ammonium salts, including diethylmethyl(2-methoxyethyl)ammonium bis(trifluoromethylsulfonyl)imide ([DEME][TFSI]) and [DEME][$BF_4$], as well as 1-ethyl-3-methylimidazlium salts, e.g. EMI-$BF_4$ and [EMI][TFSI]. Alternatively, the ionic liquid may be a lithium-based ionic liquid (i.e. an ionic liquid wherein the cation is $Li^+$), for example $LiClO_4$ or Li[TFSI].

In the devices described herein, the polymeric permeable membrane typically has a thickness of from 100 nm to 100 μm, for example from 1 μm to 50 μm, for example from 1 μm to 30 μm.

The device may have a laminar structure wherein a sheet (or sheets) of the polymeric membrane is/are sandwiched between the electrode films and the combination of the polymeric membrane(s) and electrode(s) are mounted on a substrate.

The substrate may be comprised of a rigid or flexible planar material which may comprise a continuous organic polymer, silicate based glass or a conductive metallic sheet. The substrate may also be metalised by various means to facilitate an efficient electrode. This substrate may be coated with nanocarbon material to aid industrial production.

Devices may be protected from ambient moisture ingress using a top encapsulation substrate atop the device. This barrier layer may comprise one or more layers of continuous material. Such encapsulation layers may be formed from suitable barrier materials with low absorption characteristics in the IR spectrum, such as poly(ethylene), flexible glass, quartz, sapphire, alkali metal halides, polycarbonates and poly(methyl)methacrylate.

The assembled laminar structure of the polymeric membrane(s) and electrode(s) typically has a thickness of less than 1 cm, for example less than 500 microns, or less than 100 microns, or less than 50 microns. The assembled laminar structure typically has a thickness of greater than 5 microns, such as greater than 10 microns. The layers of the laminar structure typically have a surface area of greater than 20 cm 2, typically greater than 100 $cm^2$.

The device is connectable or connected to a power source, for example a battery. More specifically, a power source is connectable or connected to the electrodes of the device. The potential difference applied across the electrodes by the power source alters the Fermi level of the carbon nanomaterials (e.g. the graphite nanoplatelets) within the electrodes to provide a thermal camouflaging effect.

The device may also comprise one or more switches or control circuitry for controlling the supply of power to the electrodes or varying the potential difference supplied by the power source to the electrodes of the device.

The device preferably also includes a pair of polymeric permeable membranes to facilitate the manufacture of the device. Using two polymeric membranes, a pair of identical polymeric membranes onto which the carbon nanomaterials have been printed can be assembled together in a symmetric manner to provide a device for active modification of thermal radiation. For example, the device may comprise a pair of polymeric membranes, wherein an electrode has been deposited onto a surface of each of the polymeric membranes. The polymeric membranes can be brought together to form a symmetrical device having a similar structure to a battery or capacitor.

As noted above, the device has a similar structure to a battery or a capacitor. As a result, it is envisaged that the devices described herein could be used as a battery or a capacitor. Accordingly, the invention also provides a capacitor or battery cell comprising:

(i) a substrate;
(ii) one or more polymeric permeable membranes comprising an ionic liquid electrolyte;
(iii) one or more electrodes comprising carbon nanotubes deposited onto the surface of at least one of the one or more polymeric membranes; and
(iv) a protective encapsulation layer.

The device and the layers within the device may have the structure or properties of the device or layers described above in connection with devices for active modification of thermal radiation.

In exemplary embodiments, the invention provides a device for active modification of (e.g. camouflaging) thermal radiation, the device comprising:

(i) one or more polymeric permeable membranes comprising polyethylene, polypropylene, or a mixture thereof comprising an ionic liquid; and (ii) one or more electrodes comprising carbon nanotubes (and optionally graphite nanoplatelets).

In one embodiment, the invention provides a device for active modification of (e.g. camouflaging) thermal radiation, the device comprising:

(i) a pair of polymeric permeable membranes comprising polyethylene, polypropylene, or a mixture thereof comprising an ionic liquid; and (ii) electrodes comprising carbon nanotubes (and optionally graphite nanoplatelets) deposited onto one surface of each of the polymeric membranes.

In a further aspect, the invention provides a method of making a device as described herein, the method comprising:

(a) depositing a liquid composition comprising carbon nanotubes (and optionally graphite nanoplatelets) onto at least one of a first and second polymeric permeable membranes in order to form a film comprising carbon nanotubes on the membranes;

(b) impregnating the first and second polymeric membrane with an ionic liquid; and (c) securing the first and second polymeric membranes to each other.

Alternatively, the polymeric membranes comprising the ionic liquid may be formed before the liquid composition comprising carbon nanomaterials is printed onto the polymeric membrane. Accordingly, the invention also provides a method of making a device as described herein, the method comprising:

(a) forming first and second polymeric permeable membranes comprising an ionic liquid;

(b) depositing a liquid composition comprising carbon nanotubes (and optionally graphite nanoplatelets) onto at least one of the polymeric membranes in order to form a film comprising carbon nanotubes;

(c) securing the first and second polymeric membranes to each other.

Instead of preparing coated first and second polymeric membranes and securing them together, the devices of the invention can be prepared by subsequent deposition of layers onto the substrate. Accordingly, in a further aspect, the invention provides a method of making a device as described herein, the method comprising:

(a) providing a substrate;

(b) depositing a liquid composition comprising carbon nanotubes (and optionally graphite nanoplatelets onto the substrate to form a first electrode;

(c) depositing a liquid comprising a polymer and an ionic liquid onto the first electrode to form a polymeric permeable membrane comprising the ionic liquid; and (d) depositing a liquid composition comprising carbon nanotubes (and optionally graphite nanoplatelets onto the polymeric permeable membrane to form a second electrode.

The liquid compositions in steps b), c) and d) typically further comprise a solvent (as described above). Accordingly, the method may also comprise allowing the solvent to evaporate after deposition of a liquid composition, but prior to the deposition of the next liquid composition.

It will be appreciated that this method is suitable for devices wherein the polymeric permeable layer is formed by co-casting the polymer with the ionic liquid (rather than impregnating the polymer, once formed into a membrane, with the ionic liquid).

The liquid compositions comprising carbon nanomaterials and the polymeric membranes used in these methods may have the properties or features of the compositions and membranes described with reference to the devices disclosed herein.

Preferably the liquid composition comprising carbon nanomaterials is deposited (e.g. printed) onto both the polymeric membranes or substrate.

When the method comprises securing the first and second polymeric membranes to each other as step c), the polymeric membranes are typically secured together so that uncoated surfaces of the two polymeric membranes (i.e. surfaces of the membranes that have not had a carbon nanomaterial-containing liquid composition deposited onto them) are in contact with each other.

The deposition steps may be conducted by spraying or printing the liquid composition onto the polymeric membrane. A wide variety of printing techniques can be used including screen printing, flexographic, offset lithographic, slot-die coating, doctor blade coating or inkjet printing.

Impregnation steps may be conducted by applying the ionic liquid to the surface of the polymeric membrane and applying a vacuum.

The methods above may also comprise the steps of securing the first and second polymeric membranes to a substrate and/or applying a protective encapsulation layer to the polymeric membranes.

The methods may include the step of obtaining a liquid composition, wherein the liquid composition comprises graphite nanoplatelets and single-walled carbon nanotubes. According, prior to step a) above, the method may comprise the following steps:

(i) obtaining exfoliated graphite nanoplatelets;

(ii) obtaining exfoliated single-walled carbon nanotubes; and (iii) dispersing the exfoliated graphite nanoplatelets, exfoliated single walled-carbon nanotubes, a thickening agent and optionally a surfactant, in a solvent.

To ensure homogenous mixing of the nanoplatelets and carbon nanotubes, the mixture in step iii) may be subjected to a high shear mixing stage. In addition, a further step of compressing (e.g. roll milling) the ink may take place to degas the ink. This facilitates printing of the inks onto membranes.

The invention also provides devices obtained according to the methods described herein. The invention also provides a method of camouflaging/concealing thermal radiation from an object, the method comprising placing a device as described herein between the object and a thermal radiation detector.

The invention can be used in a wide range of applications where modulation of IR radiation is required. This includes thermal management of objects where convention and/or conduction are not feasible, for example in electronic components in outer space. In addition, as noted above, the devices of the invention may be useful in thermal windows and emissive temperature control.

BRIEF DESCRIPTION OF THE DRAWINGS

FIG. 7 shows a plot of temperature (as recorded by infrared thermal imaging) against time after the device described in Example 3 below has been turned on.

EXAMPLES

Figure 1:
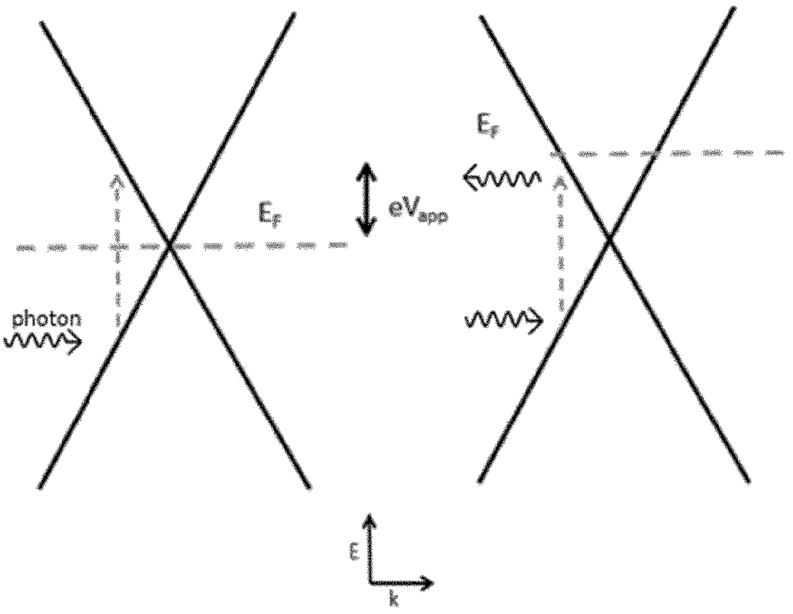
FIG. 1 illustrates the principle of Pauli Blocking to modify the band structure of graphene to block state transitions.
Figure 2:
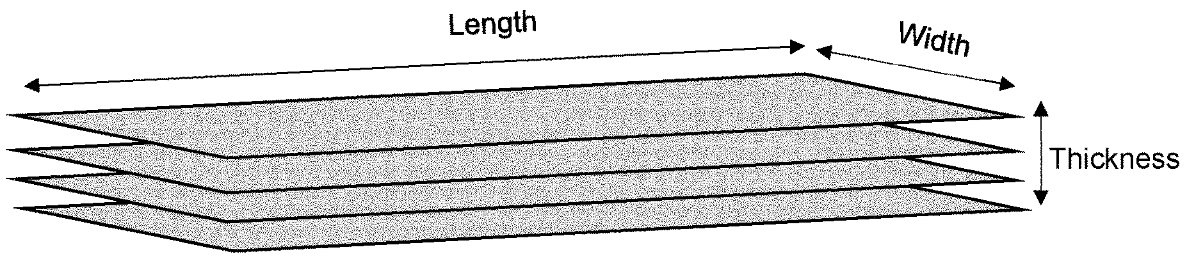
FIG. 2 is a schematic diagram showing the respective width, length and thickness of layered nanoplatelets.

Example 1—Exfoliation of Graphite to Form Nanoparticulate Graphite

Graphite flakes were exfoliated using the apparatus and process described in International Patent Application No. WO 2020/074698 (PCT/EP2019/077579) to obtain nanoparticulate graphite with a distribution of lateral sizes of on average approximately 1 μm and an average thickness of approximately 10 layers.

In summary, fine graphite powder (1-50 μm flake sizes produced by air classification of milled powder) was dispersed into a surfactant-water system and added to the inlet reservoir of a high-pressure homogeniser (such as the apparatus described in International Patent Application No. WO 2020/074698 (PCT/EP2019/077579)). The fluid was then pressurised and accelerated under decompression before exiting the process cell of the homogeniser into a heat exchanger. Once the fluid was cooled to a temperature maintained by an external chiller system, it was either collected or recirculated, depending on the system configuration.

Once the graphite had been processed, the exfoliated mixture was centrifuged at 5000 g for 20 minutes to remove all unexfoliated crystallites and larger fragments. These parameters sedimented all but the few-layer nanosheets (i.e. the nanoparticular graphite) present. The nanoparticulate graphite obtained had a distribution of lateral sizes and thicknesses ranging from 50 to 2000 nm and up to ~20 nm respectively.

Example 2—Electrode Ink Formulations

The composition is given in the table below for a batch of an ink prepared. The total solids content of the prepared ink (including binders etc.) was approximately 3.7 wt %.

| Material | Mass (g) | Fraction of dry film (wt %) |
|---|---|---|
| Nanoparticulate Graphite (obtained as described in Example 1) | 3.10 | 40 |
| Single-Walled Carbon Nanotubes (Tuball Batt-H2O SWCNTs supplied by OCSiAl) | 1.54 | 20 |
| Carboxymethylcellulose (sodium salt) | 2.70 | 34 |
| Triton X-100 | 0.50 | 6 |

To make the ink, the components were weighed into a suitable container. In order to sufficiently lower the viscosity to blend the components, the mixture was heated under mixing (hotplate at 60° C.) using a Silverson L5M-A laboratory high-shear mixer, operating at 5000 rpm. The mixture was then mixed for 5 minutes.

The graphite nanoplatelets have a distribution of lateral sizes of from 50 nm to 800 nm and have thicknesses of up to around 20 nm. The viscosity of the ink was measured over a shear rate of 0.1/s to 100/s and the inks were found to be thixotropic.

Figure 3:
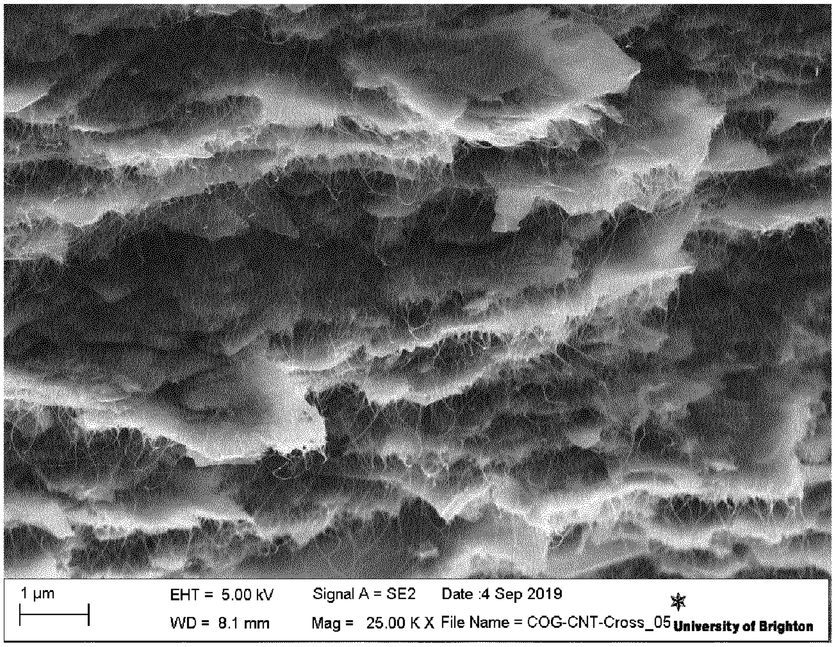
FIGS. 3 and 4 show scanning electron microscopy (SEM) images of the printed inks described in Example 2 below.
Figure 4:
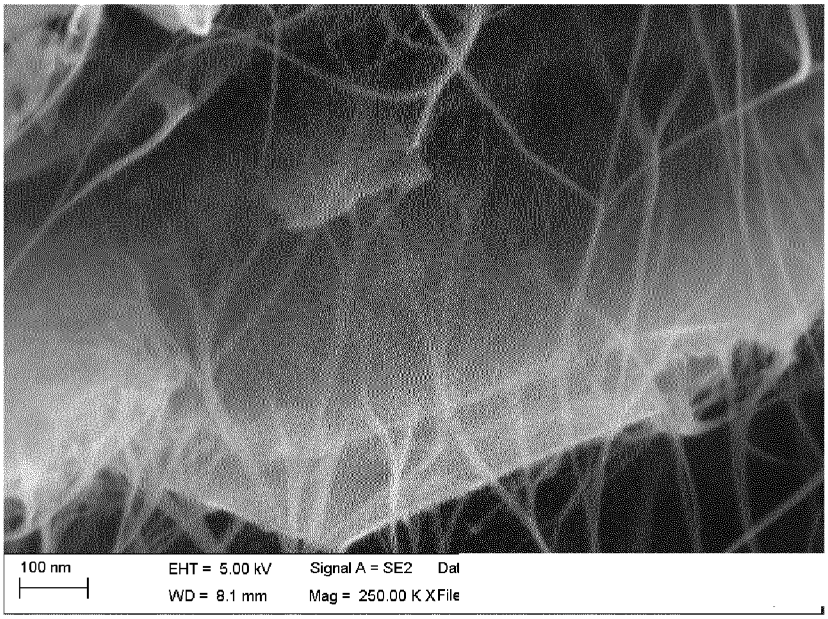

Structural characterisation was performed by SEM, indicating that there is a dense network of carbon nanotubes that exists in the interstitial spaces between packed graphite nanoplatelets (see FIGS. 3 and 4).

The inks were successfully printed on a range of substrates including several grades of polyethylene terephthalate (PET) substrate (DuPont Tejin ST504 & Felix Scholler F40100) and paper substrates.

Example 3—Film Deposition and Device Assembly

The ink of Example 2 was diluted by a factor of 20 to enable spray deposition. The diluted ink was sprayed onto a PE/PP Celgard membrane (2340) infiltrated with an ionic liquid.

200 μL/$cm^2$ of the ionic liquid, diethylmethyl(2-methoxyethyl)ammonium bis(trifluoromethylsulfonyl)imide, [DEME][TFSI], was infiltrated into the Celgard membrane by pipetting the ionic liquid onto the surface of the membrane and leaving at 100 bar for 30 minutes.

Alternatively, polyethylene membranes were infiltrated with [DEME][TFSI] by adding 100 μL per cm 2 and allowing to soak for 10 minutes. The membranes were then subjected to rolling compression to remove any excess ionic liquid. Single-walled carbon nanotubes dispersions (described in Example 2) were then sprayed with an airbrush at 3 bar at a distance of 15 cm through an appropriate stencil. This was done on a hotplate at 90° C.

The optimum performance was found at a film thickness of approximately 20 nm. The resulting film exhibited a sheet resistance of approximately 100 Ohms/sq.

The film thickness was measured via SEM cross-sectional analysis or scanning probe profilometry and the conductivity and thickness were used to calculate the specific conductivity. The conductivities of the printed films were measured using a four-point probe, in accordance with International Electrotechnical Commission standard IEC TS 62607-2-1: 2012.

Conductivities of up to 500 $kSm^{-1}$ were observed for the printed films.

The symmetrical device was then assembled by layering 2 films such that the printed, carbon-containing films had a pair of ionic liquid infiltrated Celgard membranes separating the two electrodes.

Figure 5A:
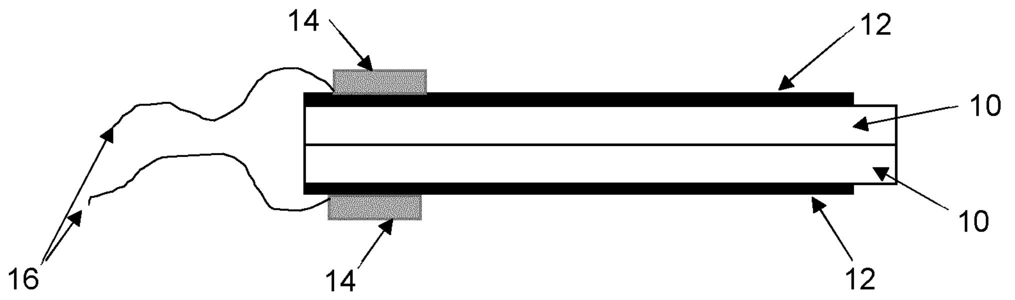
FIG. 5A schematically shows the construction of a device according to one embodiment of the invention.

The structure of the device is shown schematically in FIG. 5A. The device comprises a pair of ionic liquid infiltrated Celgard membranes (10). On one side of each membrane is a film (12) printed from the ink described in Example 2. These printed films act as electrodes for the device. Electrical contacts were made with the electrodes using copper tape (14) and were connected to a voltage source by wires (16).

Figure 5B:
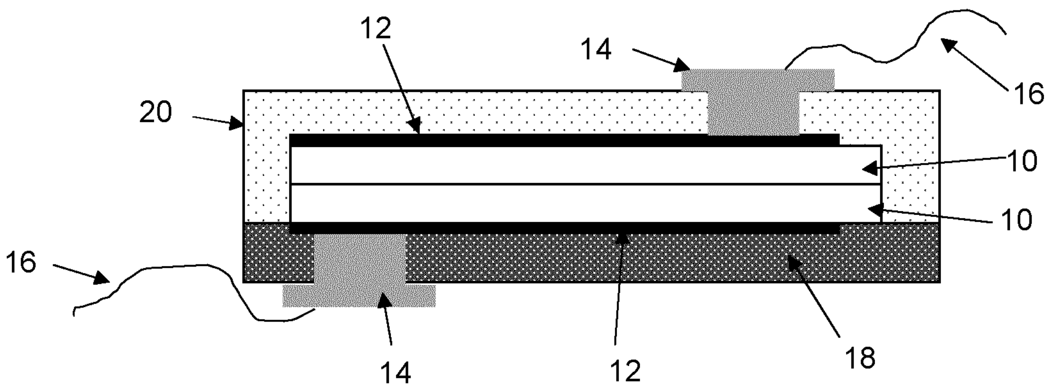
FIG. 5B schematically shows the construction of a device according to a further embodiment of the invention and shows a substrate and protective encapsulation layer.

The structure of an alternate device, which comprises a substrate and a LDPE, IR-transparent protective layer, is shown in FIG. 5B. The structure of the device in FIG. 5B comprises an arrangement substantially as shown in FIG. 5A. However, the device also comprises a PET substrate (18) and a protective encapsulation layer (20) formed from LDPE (low density polyethylene). Copper connectors (14) penetrate through the substrate (18) and protective layer (20) to allow for connection of the electrodes (12) to an external voltage/power source via wires (16).

Example 4—Device Operation

Figures 6A, 6B, 6C:
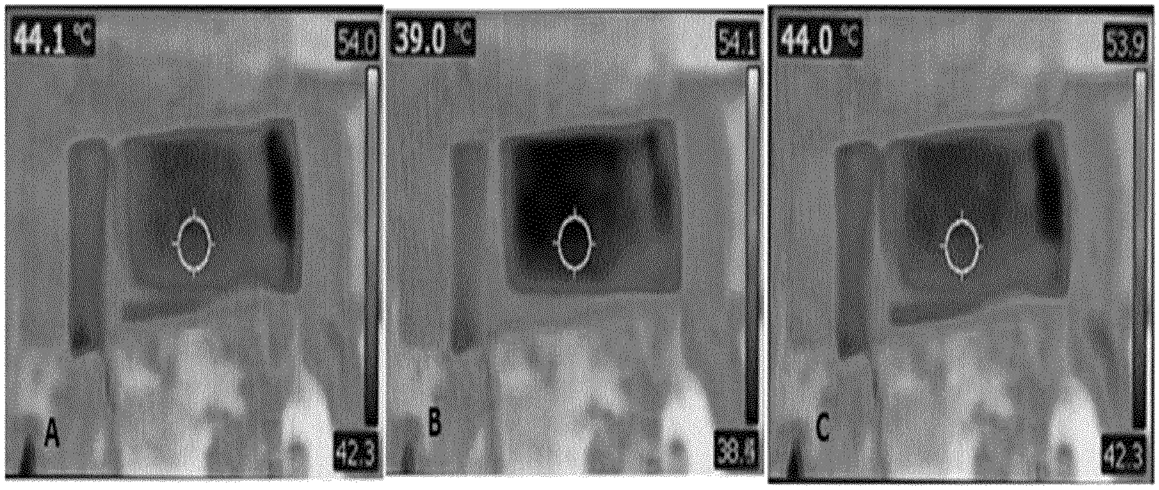
FIGS. 6A to 6C are thermal images showing the change of thermal emissivity of the device described in Example 3 on a hotplate at 55° C.

FIGS. 6A to 6C shows the change of thermal emissivity of the device described in Example 3 on a hotplate at 55° C. FIGS. 6A to 6C were obtained using an FLIR C2 thermographic camera. The temperatures indicated at the top left of each Figure indicate the temperature measured at the circle displayed at the centre of each image.

FIG. 6A shows the device in Example 3 on a hotplate at 55° C. with no potential difference applied to the device (i.e. with the device in a non-functioning state).

After a potential difference of 5V was applied to the two carbon-based electrodes of the device, the device took approximately about 20 seconds to reach a minimum temperature. This is shown in FIG. 6B.

FIG. 6C shows the temperature of the device 10 seconds after the potential difference was removed from the device.

Figure 7:
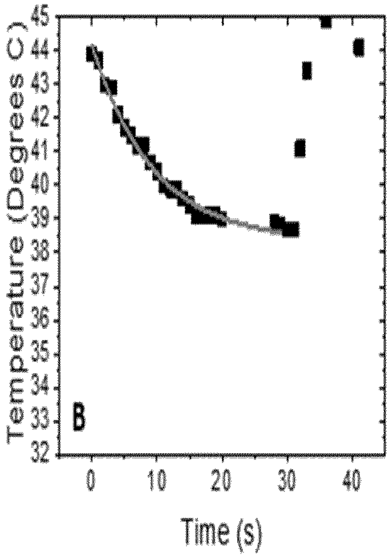

A plot of temperature (as recorded by infrared thermal imaging—see FIGS. 6A to 6C) against time as shown in FIG. 7. This shows that there was an overall temperature drop of 5° C. once the device was switched on which takes about 20 seconds. Plotting the data with an exponential decay yields a time constant of about 9.5 seconds.

Figure 8A:
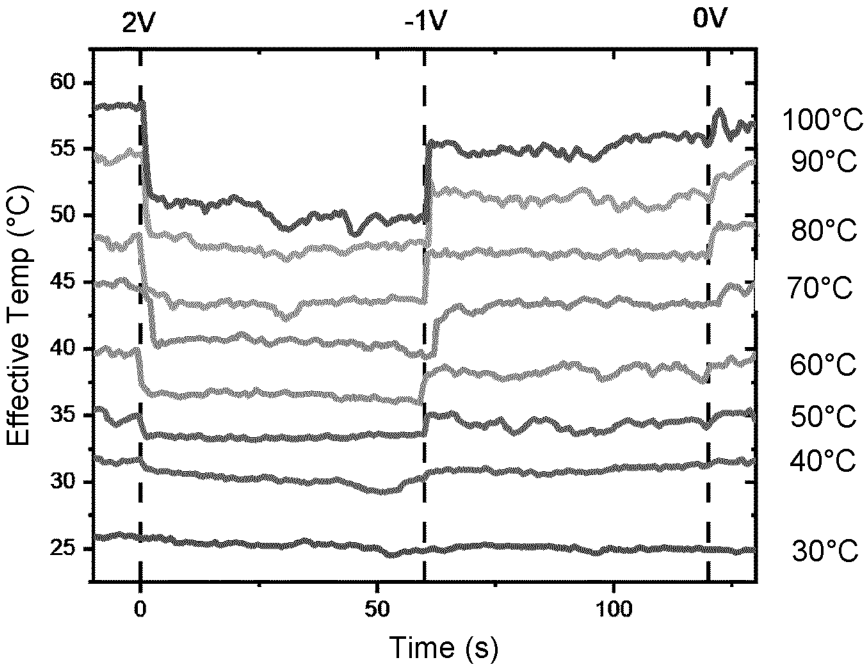
FIG. 8A shows a plot of temperature (as recorded by infrared thermal imaging) against time over a range of temperatures during a change of voltage applied to the device for a device as described in Example 3, but wherein the electrodes comprise only carbon nanotubes FIG. 8B summarises the temperature changes shown in FIG. 8A as a function of the temperature of the body behind the device.

A similar effect was seen with a device formed as described in Example 3, but wherein the electrodes comprised only carbon nanotubes (rather than being formed from the ink described in Example 2). This is shown in FIG. 8A.

For this experiment, a device as described in Example 3 above was formed, but wherein the electrodes were formed solely from carbon nanotubes (rather than a combination of graphite nanoplatelets, carbon nanotubes and carboxymethylcellulose). The voltage applied to the device over the time period measured is shown at the top of the graph of FIG. 8A. FIG. 8A shows the measured temperature of a body placed behind the device (relative to the infrared temperature sensor). FIG. 8A shows the ability for the device to modulate the apparent temperature of the body over a range of temperatures from 30° C. to 100° C.

Figure 8B:
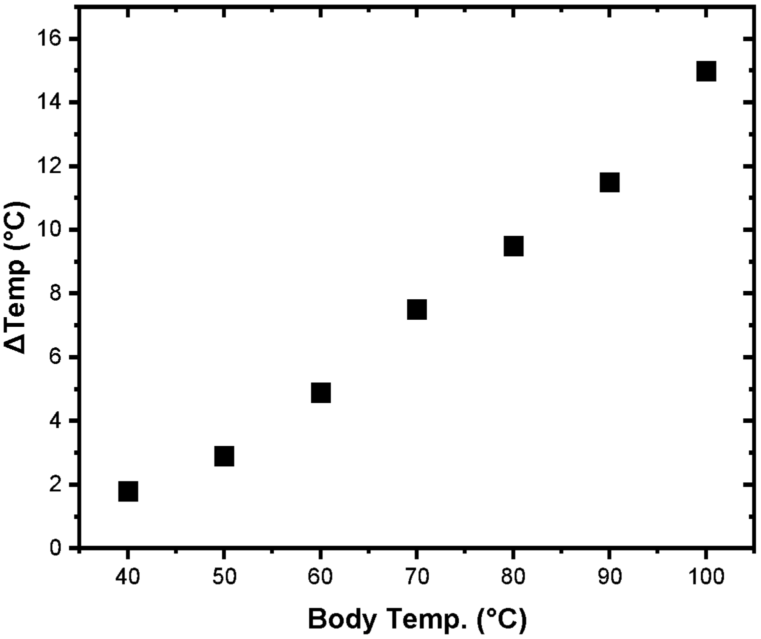

FIG. 8B shows the change in temperature (shown in FIG. 8A) as a function of the temperature of the body (whose temperature is being measured/modulated).

The series of recorded emissivities at different temperatures demonstrates the fast device switching and effectiveness in lowering of apparent temperature.

Similar effects were observed with metallic and semiconductor carbon nanotubes and a comparison of the results is provided below:

| Carbon Nanotubes | Potential Range | $\varepsilon_{max}$ | $\varepsilon_{min}$ | $\Delta\varepsilon/\varepsilon$ |
|---|---|---|---|---|
| Semiconductor | −1 V to 2.5 V | 0.54 | 0.24 | 0.56 |
| Metallic | −2 V to 3 V | 0.61 | 0.31 | 0.49 |

Example 5—Further Characterisation of the Devices

Raman measurements were performed using a Renishaw inVia Qontor spectrometer with 488 nm (2.54 eV), 532 nm (2.33 eV), 660 nm (1.88 eV) and 785 nm (1.58 eV) laser sources. Acquisition powers ranged from 4-7 mW with 10 accumulations of 10 seconds. Multi-spectral Raman allows evaluation of nanotube diameter by focusing on the radial breathing modes (RBMs) in the range 152-192 $cm^{-1}$. The relationship between the RBM position and the diameter is slightly confounded by a bundling contribution, but it is estimated that the diameter of the carbon nanotubes in the films is between 1.1 nm and 1.4 nm.

Figure 9A:
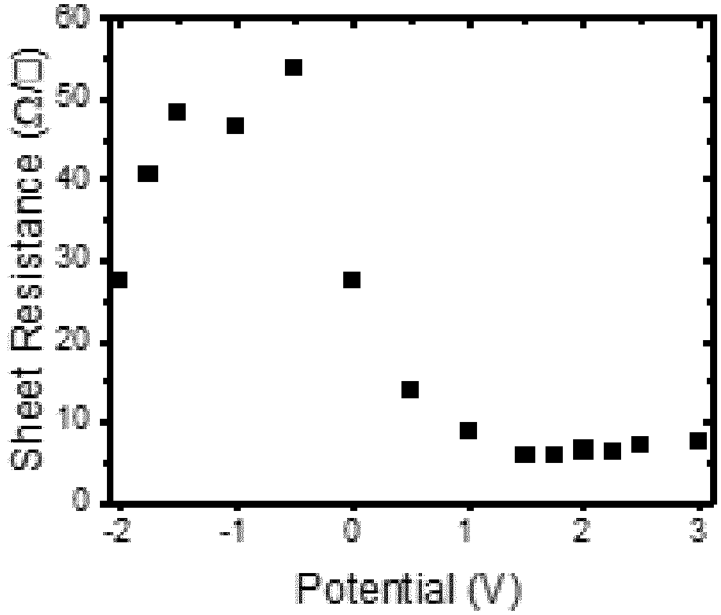
FIG. 9A shows the sheet resistance as a function of potential difference applied to a device as described in the Examples below.

The sheet resistance (FIG. 9A), achieved by four probe IV measurements on the top surface of the device, shows dramatic changes in sheet resistance for the carbon nanotube-containing film. This is considered to correspond to the optical properties of the film.

Figure 9B:
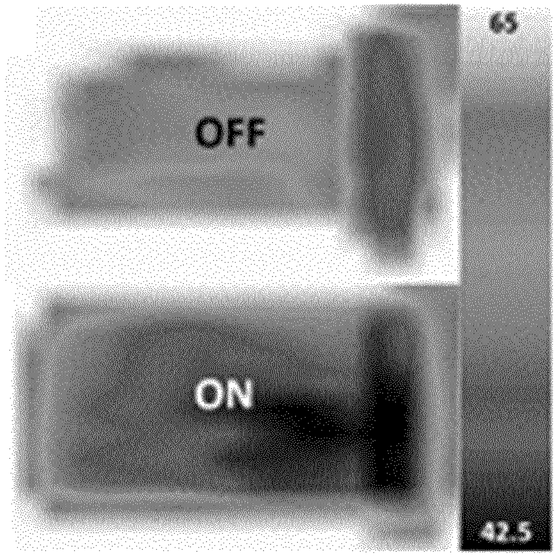
FIG. 9B shows the device tested in FIG. 9A when biased at −1V in the off state and +2V in the on state under an infrared camera with temperatures.

FIG. 9B shows the device when biased at −1V in the off state (near the maximum sheet resistance in FIG. 9A) and +2V in the on state (near the minimum sheet resistance) under an infrared camera with temperatures going from over sixty degrees to below 50 degrees. The time-temperature profile of the device at a variety of temperatures is shown in FIG. 1*e*. The temperature drop occurs over <10 seconds on turning from 0V to +3V and similarly from going into the off state of −1V. The temperature drop is more pronounced as temperature increases due to the modulation of emissivity.

Example 6—Device Made from Co-Cast Ionic Liquid-Infused Polymeric Membrane

In a further example, a further ink was prepared from 0.4 wt % single walled carbon nanotubes 0.4 wt % in water with 0.8 wt % sodium carboxymethyl cellulose, as purchased from OCSiAl. The carbon nanotube dispersion was diluted by a factor of 10 in deionised water and sonicated in a bath for 10 minutes to form a sprayable ink.

The ink was then sprayed with an airbrush at 3 bar at a distance of 15 cm through an appropriate stencil to form a carbon nanotube-containing electrode layer. This was done on a hotplate at 90° C.

A polymeric membrane was formed on top of the carbon nanotube-containing electrode layer by cocasting poly(vinylidene fluoride-co-hexafluoropropylene) (PVDF-HFP) with the ionic liquid [EMI][TMSI] to form a membrane having a thickness of 30 μm. To achieve this, a solid electrolyte precursor liquid comprising 1.94% (w/w) PVDF-HFP, 2.91% (w/w) [EMI][TFSI] and 95.15% (w/w) of acetone was dropcast at 200 μL per $cm^2$ onto the carbon nanotube-containing electrode later. The solvent was allowed to evaporate to leave a membrane comprising 60% [EMI][TSFI] and 40% PVDF-HDP.

A second carbon nanotube-containing electrode layer was then formed on top of the polymeric membrane in a similar manner to the first carbon nanotube-containing electrode.

The device was then constructed in an analogous manner to the device described in Example 3 above.

The device described above was shown to possess similar properties to the device as described in Example 3 with regard to its ability to modify the apparent temperature of an object.

Figure 10A:
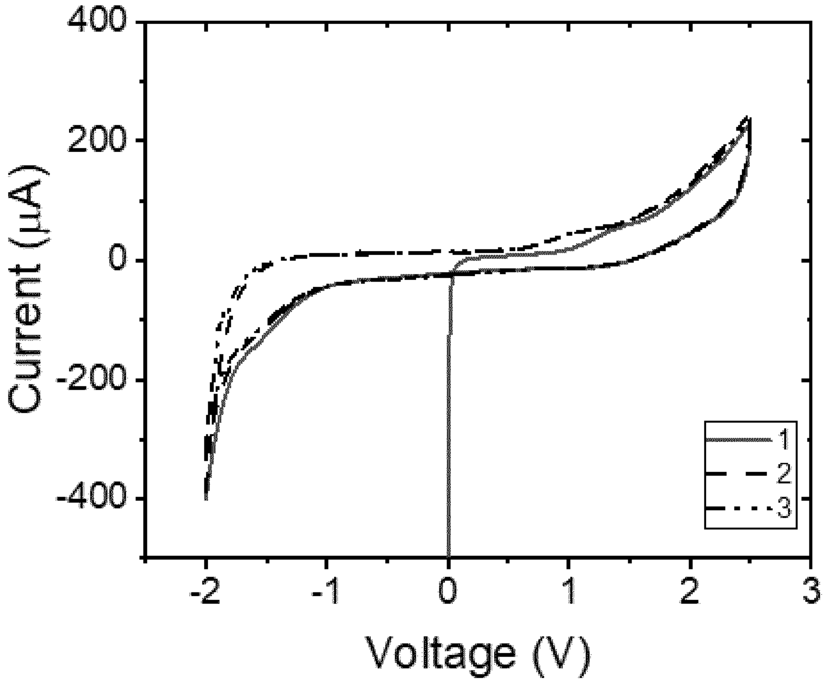
FIG. 10A is a cyclic voltammetry plot of a device as described in Example 6.

FIG. 10*a* shows 3 cycles of a cyclic voltammetry at 10 mV/s. The currents are largely stable with a box-like shape in the low potential range (−1 to +1 V). There are regions of increased current at higher potentials attributed to intercalation of electrolyte ions or increased density of electronic states.

Figure 10B:
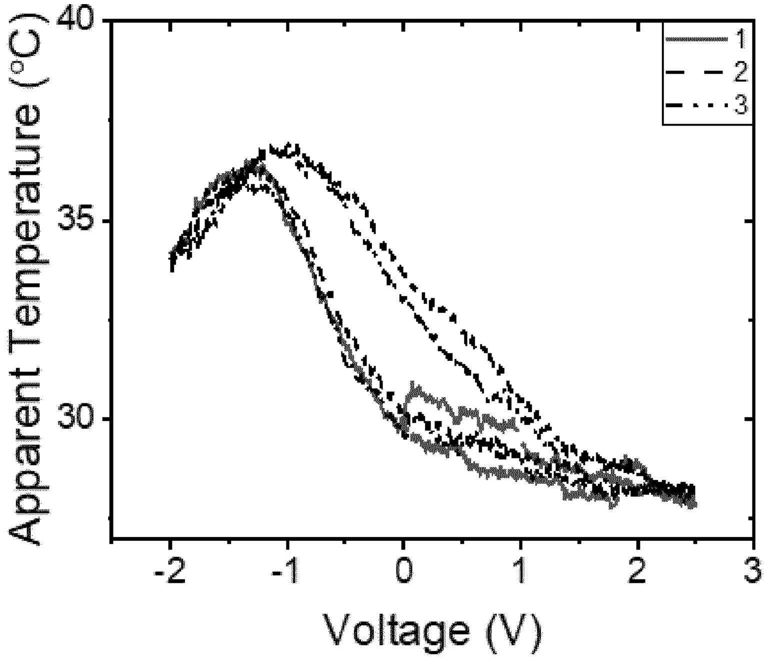
FIG. 10B shows the apparent temperature of a device as described in Example 6 when placed above a 70° C. hot plate.

FIG. 10*b* shows the apparent temperature of the device on a hot-plate at 70° C. as it is cycled. This again shows good thermal stability over the 3 cycles with a maximum temperature at −1V and a minimum around +2.5V.

Figure 10C:
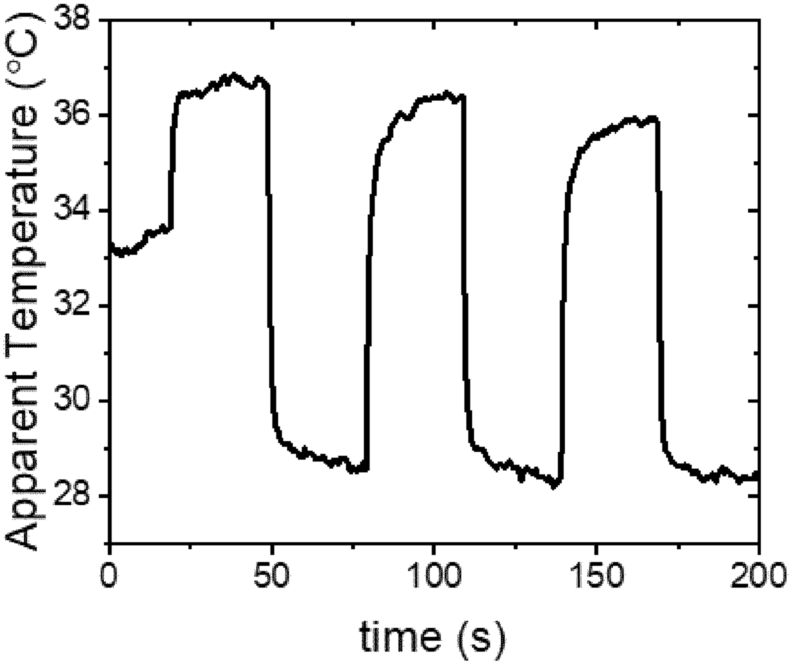
FIG. 10C shows the switching of a device of Example 6 between −1V and 2.5V.

FIG. 10*c* shows the switching if the device between −1 and +2.5V 3 times. 90% of the switching occurs over the first 10 seconds after switching. This shows the viability of the device made in accordance with this example.

The invention claimed is:

1. A method of making a device for active modification of thermal radiation, the method comprising:

(a) providing a non-metallic substrate;

(b) depositing a liquid composition comprising carbon nanotubes onto the substrate to form a first electrode;

(c) depositing a liquid comprising a polymer and an ionic liquid onto the first electrode to form a polymeric permeable membrane comprising the ionic liquid; and (d) depositing a liquid composition comprising carbon nanotubes onto the polymeric permeable membrane to form a second electrode.

2. A method according to claim 1 wherein the first and/or second electrodes further comprise graphite nanoplatelets.

3. A method according to claim 2 wherein the carbon nanotubes and graphite nanoplatelets are present in the first and/or second electrodes in a weight ratio of from 0.15:1 to 0.6:1 (carbon nanotubes:graphite nanoplatelets).

4. A method according to claim 1 comprising single-walled carbon nanotubes.

5. A method according to claim 4 wherein the carbon nanotubes have a mean diameter of from 1 nm to 5 nm.

6. A method according to claim 4 wherein the carbon nanotubes have a mean length of greater than 3 μm.

7. A method according to claim 1 wherein the first and/or second electrodes further comprise a thickening agent.

8. A method according to claim 1 wherein the polymeric membrane comprises polyethylene, polypropylene, polyvinylidene fluoride or a mixture thereof.

9. A method according to claim 1 wherein the ionic liquid has an electrochemical window of 4V or greater.

10. A method according to claim 1 wherein the carbon nanotubes are present in the first and second electrodes in an amount of from 15% (w/w) of the total electrode composition.

11. A method according to claim 1 wherein the first and second electrodes comprise carbon nanotubes as the only carbon nanomaterial and are present in the electrodes in an amount of 50% or greater.

12. A method according to claim 1 which further comprises applying a protective encapsulation layer.

13. A method according to claim 1 wherein the first electrode is deposited onto the substrate by printing.

14. A method according to claim 1 wherein the second electrode is deposited onto the polymeric permeable membrane by printing.

* * * * *